Dec. 10, 1963　　　　M. A. HALL　　　　3,114,020
HIGH RESOLUTION DIGITAL POSITION TRANSDUCER
INCLUDING A MAGNETIC SWITCH
Filed May 5, 1961　　　　　　　　　　2 Sheets-Sheet 1

INVENTOR.
MICHAEL A. HALL
BY Louis J. Knobbe
ATTORNEY

Dec. 10, 1963  M. A. HALL  3,114,020
HIGH RESOLUTION DIGITAL POSITION TRANSDUCER
INCLUDING A MAGNETIC SWITCH
Filed May 5, 1961  2 Sheets-Sheet 2

INVENTOR.
MICHAEL A. HALL
BY
Louis J. Knobbe
ATTORNEY

# United States Patent Office 3,114,020
Patented Dec. 10, 1963

3,114,020
HIGH RESOLUTION DIGITAL POSITION TRANSDUCER INCLUDING A MAGNETIC SWITCH
Michael A. Hall, San Francisco, Calif., assignor to Beckman Instruments, Inc., a corporation of California
Filed May 5, 1961, Ser. No. 107,991
6 Claims. (Cl. 200—87)

The present invention relates generally to a high resolution digital position transducer and, more particularly, to such a transducer employing switch elements actuated by changing a magnetic field.

Prior art digital transducers may be broadly classified into two groups: those which require a physical contact between the movable and stationary members and those which do not. The most common example of the former type of transducer is a commutative type switch assembly in which a contact brush mounted on the movable member sequentially engages spaced contact members on the stationary member. This type of transducer has the distinct advantage of being adapted for controlling relatively large currents without supplemental electronic circuitry. This advantage, may however, be outweighed by such disadvantages as being adversely affected by dust, if not sealed; mechanical wear; contact burning; and the requirement of a relatively large force between the movable and stationary members. Common examples of the latter type of transducer are photoelectric, capacitive and inductance type devices. Although this type of transducer has the advantage of requiring only a minimum force exerted between the stationary and movable members in order to obtain an indication of the movement of the movable member relative to the stationary member, such devices are not adapted for passing currents of substantial magnitude. Additional electric circuitry is ordinarily required with such transducers in order to utilize them for controlling useful current values. Lacking in the prior art is a transducer combining the desirable features of both types of transducers wherein the resultant transducer would require only a minimum force to be exerted between the stationary and movable members while controlling useful current magnitudes.

Accordingly, it is an object of the present invention to provide an improved digital position transducer which does not require any physical connection between the movable and stationary members while providing a control over relatively high current values.

Another object of this invention is to provide a digital position transducer characterized by a fine resolution and low mechanical wear.

It is a further object of this invention to provide a digital position transducer which may be constructed at low cost and yet have a useful life of several millions of operations.

Other and further objects, features and advantages of the invention will become apparent as the description proceeds.

Briefly, in accordance with a preferred form of the present invention, there is provided a sealed mercury-wetted switch capsule having first and second spaced magnetic electrodes sealed in one end and a third electrode, with a magnetic reed attached, sealed in the other end. This reed is so positioned that it may make electrical contact with one or the other of the first and second electrodes. A symmetrical magnetic field is established in the proximity of the first and second electrodes with a sufficient gap between the magnetic field source and the electrodes to accept a member which is movable relative the capsule and magnetic field source. This movable member includes alternately spaced portions of high and low permeability material. Since the magnetic reluctance path is lowest between the magnetic field source and a switch electrode when a high permeability member is located therebetween, the switch reed is attracted to the electrode nearest such a portion of the movable member. As this member is moved relative to the switch capsule, the high and low permeability sections are sequentially brought nearest first one and then the other magnetic electrode so that the reed is alternately attracted to one electrode and then the other electrode so as to give a digital indication of the movement thereof.

Transducers constructed in the manner described, provide important advantages over prior art devices. Thus, the use of a sealed mercury-wetted switch permits substantial current magnitudes to be switched without contact wear. Also, the force required between the stationary and movable members is not large since one high permeability portion of the movable member always approaches the magnetic field source as another high permeability portion leaves the magnetic field source, thereby substantially cancelling the magnetic field forces acting on the movable member.

A more thorough understanding of the invention may be obtained by the following detailed description taken in connection with the accompanying drawings in which.

Figure 1:
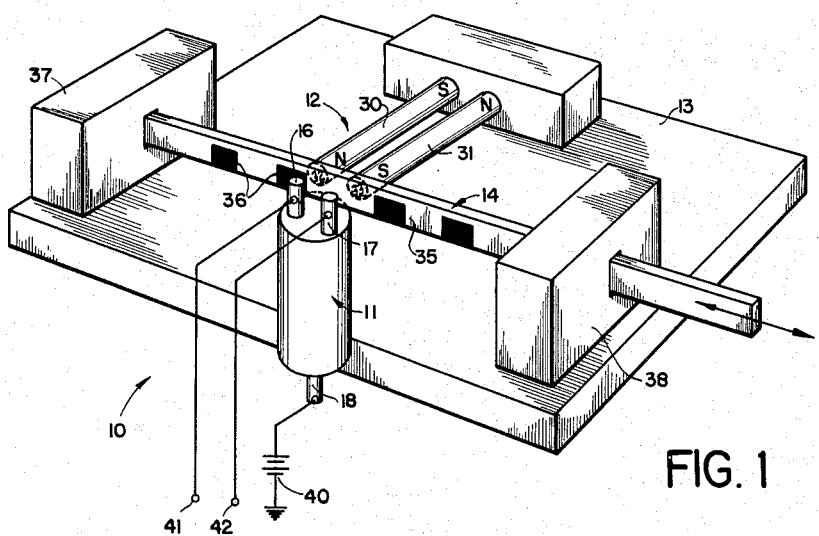
FIG. 1 is a perspective view of a preferred embodiment of a digital transducer constructed in accordance with the present invention.

Referring now to FIG. 1, there is shown in perspective view a preferred embodiment of a digital position transducer 10 constructed in accordance with the present invention comprising switch 11 and a magnetic field generating source 12 attached to a base 13, and a member 14 movable in a linear direction relative to the base 13.

Figure 2:
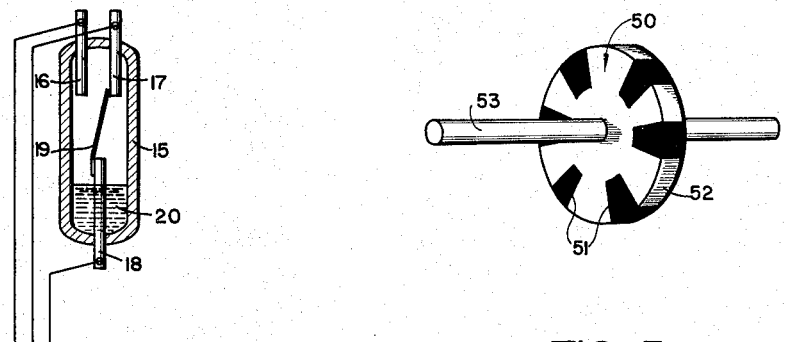
FIG. 2 is a side view of a preferred switch capsule for use in digital transducers constructed in accordance with the present invention.

As shown in FIG. 2, switch 11 is preferably constructed as a sealed switch comprising a glass capsule 15 in which a first magnetic electrode 16 and a second magnetic electrode 17 are sealed in one end thereof. A third electrode 18 is sealed in the other end of the capsule and has attached thereto within the housing a magnetic reed 19. As shown, this reed is positioned between the first and second electrodes so that it may make electrical contact with either the first or the second electrodes. Switch 11 is, therefore, a single-pole, double-throw switch. In some applications, it may be desired to place a small amount of mercury 20 in the capsule 15. Mercury then rises to the tip of reed 19 by capillary action and serves to wet the electrodes 16 and 17 and the reed 19, thereby providing an excellent metallic contact between the reed and the electrode closest to the reed. This mercury presents a clean contact surface each time the switch is closed, thereby giving very low contact resistance. Also, this mercury provides a make-before-break switch operation which may be preferred in some applications of the transducer. An inert gas under high pressure is preferably introduced into the tube so as to increase the voltage limits and quench any arcs that may form during the switching operation. By way of example only, a switch capsule taken from a Type HG relay sold by the C. P. Clare & Co., Chicago 45, Illinois, has proven to be entirely satisfactory for use in a transducer constructed in accordance with the present invention.

Magnetic field source 12 is designed to establish a symmetrical magnetic field near the magnetic switch electrodes 16 and 17. This source may conveniently take the form of a pair of oppositely poled, equal strength magnets 30 and 31 having ends 32 and 33 juxtaposed respective magnetic switch electrodes 16 and 17. As a result, the magnetic flux densities proximate the electrodes 16 and 17 are substantially equal unless an element of nonhomogeneous permeability is interposed between the electrodes 16, 17 and magnets 30, 31. Ordinarily, the magnetic members 30 and 31 will be permanent magnets preferably constructed from the aluminum-nickel-cobalt alloy sold under the trademark Alnico V. However, it will be apparent that electromagnetic elements may be also utilized as the magnetic field source. Also, a single magnetic member either in permanent magnet or electromagnetic form may be substituted for the dual magnets 30 and 31. Such a single magnet (not shown) would have its north and south poles respectively juxtaposed the magnetic switch electrodes.

Figure 3A:
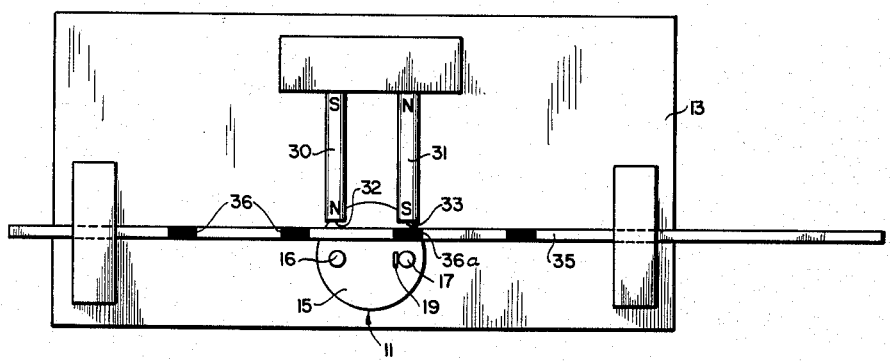
FIGS. 3a and 3b are top views of a preferred embodiment of a digital transducer constructed in accordance with this invention showing in detail the dimensional relationship between the capsule magnetic electrodes, the magnetic poles and the high permeability teeth incorporated in the low permeability movable member.
Figure 3B:
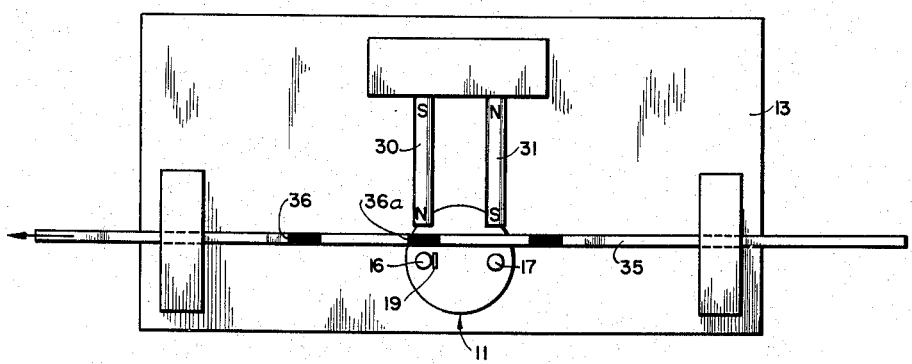

Movable member 14 formed as an element of nonhomogeneous permeability comprises a rod 35 of low permeability material such as brass or stainless steel in which spaced teeth 36 of high permeability material such as cold rolled steel are retained. As shown in FIG. 1, rod 35 is slidably mounted in upstanding bearing blocks 37 and 38 which are rigidly attached to the base 13. The spacing and width of teeth 36 relative to the magnetic electrode 16 and 17 and magnetic members 30 and 31 are clearly illustrated in FIGS. 3a and 3b. In the embodiment shown, the teeth 36 are equal in width, their width being of the same order of magnitude as the width of magnet faces 32, 33. Also, as shown, the teeth are equally spaced. The spacing of these teeth is greater than the spacing of the magnet pole pieces 30 and 31 so that only one tooth such as tooth 36a is opposite an electrode at any given position of the rod 35. It may further be noted that the magnet pole pieces 30, 31 and the switch electrodes 16, 17 are serially spaced along the path defined by the alternately spaced teeth 36 of the rod 35.

The operation of the digital transducer will now be described: Switch 11 is designed to be actuated by the application of an external magnetic field to one or the other of the magnetic electrodes 16 and 17. Because of the magnetic construction of each of the electrodes 16, 17 and reed 19, the reed will be attracted to whichever of the electrodes is applied the stronger magnetic field. Since the magnetic reluctance path is lowest between the magnetic source 12 and the electrode nearest the high permeability tooth 36a, the reed is attracted to that electrode since the stronger magnetic field is applied thereto. Thus in the illustration of FIG. 3a, the reed 19 is attracted to electrode 17 since this electrode is adjacent the magnetic tooth 36a. As rod 35 is translated in the direction shown in FIG. 3b (from right to left) tooth 36a is caused to leave its position adjacent electrode 17 and assume a position adjacent electrode 16 thereby weakening the magnetic field strength applied to electrode 17 while strengthening the magnetic field strength applied to electrode 18. As a result, reed 19 is abruptly attracted away from electrode 17 to electrode 16. Stated in another way, the switch 11 is actuated from a first stable position of electrical contact between electrodes 17 and 18 to a second stable position of electrical contact between electrodes 16 and 18. Further translation of the rod 35 causes the reed 19 to be alternately switched from one electrode to the other. Accordingly, switch 11 in series with a suitable power source 40 will provide an output switching signal indicative of the length of travel of the rod 35 relative to the base 13. The number of times that reed 11 is attracted from one electrode to the other and then back to the original electrode (defined herein as a switch cycle) per unit length that movable member 14 is translated, i.e., the resolution of the device, is dependent upon the number of alternate high and low permeable sections per unit length of member 14. By way of example, a digital transducer constructed in accordance with this invention provides a resolution of four switch cycles per inch of translation. Relatively rapid movement of the member 14 may also be precisely measured by transducers constructed in accordance with this invention since commercially available wetted mercury capsules permit switching rates as high as one hundred switch cycles per second.

As previously noted, mercury placed in the switch capsule ordinarily provides a make-before-break switch operation. This operation is retained when the capsule is utilized in the transducer of this invention with one possible exception, namely that when a magnetic tooth is slowly translated between the magnetic pole faces 32 and 33, the switch reed 19 has a tendency to follow the magnetic tooth. Its travel time between the magnetic switch electrodes may then be very slightly delayed so as to obviate the conductive bridging action of the mercury. This very minute delay in switch actuation time is especially evident in transducers employing a relatively weak magnetic field source 12. It may be noted, however, that the action just described in no way affects the resolution and repeatability accuracy of the digital transducer, its only effect being to possibly obviate a make-before-break switch operation for alternate digital outputs.

Figure 4:
FIG. 4 illustrates representative output waveforms generated by a digital transducer constructed in accordance with the present invention.
Figure 4:

Representative output waveforms generated by the transducer of FIG. 1 are illustrated in FIG. 4. As shown, a direct current source such as battery 40 provides a series of mutually exclusive square waves between output terminal 41 and ground and between output terminal 42 and ground. These square waves may be utilized for directly actuating a readout circuit such as a pair of lamps (not shown) respectively in series with electrodes 16, 18 and electrodes 17, 18. Or, preferably, these output waveforms may be employed in the position indicating system disclosed and claimed by D. E. Lehmer in the copending application Serial No. 107,990 entitled "Position Indicating System," filed on even date herewith and assigned to Beckman Instruments, Inc., assignee of the present invention.

Position transducers constructed according to the present invention have several advantages over transducers known in the art. Thus, the output signal is derived through mechanically actuated switch contacts; as a result, substantial voltages and currents may be switched with such transducers. Moreover, the switch is inherently sealed, thereby avoiding deleterious effects of dust and other atmospheric contaminants. Significantly, however, this mechanical switch actuation is accomplished without physical contact between the stationary and movable members, thereby substantially reducing the force required to translate the movable member. The forces required to translate the movable member in transducers constructed according to the present invention are minimal since as one high permeability portion of the member leaves the magnetic field source, another high permeability portion approaches the magnetic field source. As a result, the magnetic forces acting upon the movable member are mutually cancelled to a substantial degree.

An additional advantage of the present invention is that it provides a positive and precise actuation of the switch contacts even though a mechanical connection therewith is unnecessary. This operation is provided by the fact that the magnetic properties of the reed and magnetic electrodes cause the reed to remain at a particular electrode after the magnetic field strength at that electrode has been reduced. Accordingly, the reed does not leave an electrode until it is attracted by a positive force to the opposite electrode, this force causing a rapid movement of the reed from the one electrode to the other. In effect, hysteresis is added to the movement of the reed, thereby resulting in a bistable switch operation without a center "off" position. This operation is clearly illustrated in FIG. 4 wherein it may be seen that square wave 45 begins substantially coincident with the termination of the previous square wave 46.

A significant corollary to the hysteresis type of switch actuation and an additional advantage of the present invention is that a given movement of the movable member produces an output waveform which is repeatable to within very fine tolerances. By way of example, the position transducer constructed in accordance with this invention provides repeat actuation of the switch 11 from one stable state to the other within 0.005 inch of movement of the movable rod 35.

Previously, the movable member 14 has been described as having equally spaced magnetic teeth. This spacing will achieve equal width output pulses (as shown in FIG. 4) so long as member 14 is driven at a constant velocity throughout its movement. In some applications, however, the member 14 may not be driven at a constant velocity, e.g. it may be started from rest and accelerated under a constant force. In such instances, the velocity of the teeth with respect to the magnetic field poles and the magnetic switch electrodes will vary for the several teeth. As a result, the generated output pulses will not be of equal width. This varying velocity of the rod may be compensated for, however, in those applications wherein the rod is always translated in the same manner, albeit at a nonconstant velocity, by suitably varying the spacing between adjacent teeth (so long as the teeth are spaced greater than the spacing of the pole pieces and switch electrodes). Thus, those teeth which are translated past the switch at the highest velocity will be spaced further apart than those teeth having a lower translational velocity when juxtaposed to the magnetic switch electrodes. So constructed, pulses of substantially uniform width may be derived from the output of the switch 11.

Figure 5:
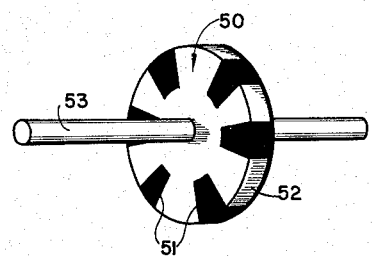
FIG. 5 is a perspective view of an alternative type of movable member which may be utilized in position transducers constructed in accordance with the present invention.

An alternative form of the movable member is shown in FIG. 5 as comprising a nonhomogeneous disc 50 employing spaced radial high permeability segments 51 affixed in a low permeability body 52. Disc 50 may be utilized in a number of digital position transducers adapted for detecting and/or measuring rotary movement. For example, disc 50 mounted upon a rotatable shaft 53 may be substituted for the rod 35 so as to provide a shaft position transducer.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. A position transducer comprising first and second spaced magnetic electrodes, a magnetic reed located between said electrodes, first and second substantially parallel magnetic field generating elements respectively juxtaposed to said first and second electrodes, and a nonhomogeneous member including serially spaced sections of alternate high and low magnetic permeability material movably located between said electrodes and magnetic field generating elements, said serially spaced sections being substantially aligned with said electrodes and said first and second magnetic field generating elements so that movement of said nonhomogeneous member causes said sections to be sequentially located proximate said first and second magnetic field generating elements.

2. A position transducer comprising a base, a sealed mercury-wetted switch capsule affixed to said base and having first and second spaced magnetic electrodes sealed in one end thereof, a third electrode sealed in the other end thereof, and a magnetic reed attached to said third electrode within said capsule between said first and second electrodes so that said reed is attracted to whichever of the first and second electrodes has applied thereto the stronger external magnetic field; a pair of substantially parallel magnetic pole pieces affixed to said base and respectively juxtaposed to said first and second magnetic switch electrodes; a nonhomogeneous member linearly translatably mounted upon said base between said pole pieces and said electrodes, said member including alternately spaced portions of high and low magnetic permeability.

3. A position transducer comprising a base, a sealed mercury-wetted switch capsule affixed to said base and having first and second spaced magnetic electrodes sealed in one end, a third electrode sealed in the other end thereof, and a magnetic reed attached to said third electrode within said capsule between said first and second magnetic electrodes so that said reed is attracted to whichever of said first and second electrodes has applied thereto the strongest magnetic field; a first magnetic pole piece having its north pole juxtaposed to said first electrode affixed to said base; a second magnetic pole piece having its south pole juxtaposed to said second magnetic electrode affixed to said base; a rod constructed of low permeability material mounted upon said base so as to be linearly translatable with respect thereto and located between said magnetic pole pieces and said first and second electrodes, said rod having spaced teeth of high permeability material, the width of said teeth being approximately the width of said magnetic pole pieces and the spacing of said teeth being somewhat wider than the distance between said magnetic pole pieces.

4. A position transducer comprising a fixed bistable switch having first and second spaced magnetic electrodes and a magnetic reed attracted to whichever of the first and second electrodes has applied thereto the stronger external magnetic field; means for generating a magnetic field including first and second fixed magnetic pole pieces, said first and second magnetic pole pieces being located in close proximity to said respective first and second electrodes; and a single movable member having alternately spaced portions of high and low magnetic permeability interposed between said switch means and said magnetic field generating means, said first and second magnetic pole pieces being substantially parallel to each other and serially spaced along the path defined by said alternately spaced portions of high and low magnetic permeability so that said reed is attracted to either one or the other of said magnetic electrodes and, upon movement of said movable member in a predetermined direction, said magnetic reed is alternately attracted to said first and second electrodes.

5. The position transducer defined in claim 4 wherein said movable member comprises a rod constructed of low permeability material and having spaced teeth of high permeability material, said rod being linearly translatable with respect to said fixed bistable switch and said fixed magnetic pole pieces.

6. The position transducer defined in claim 4 wherein said movable member comprises a rotatable disc constructed of low permeability material having spaced radial sections of high permeability material.

References Cited in the file of this patent

UNITED STATES PATENTS

| | | |
|---|---|---|
| 2,445,406 | Pollard | July 20, 1948 |
| 2,459,306 | Burton | Jan. 18, 1949 |
| 2,769,875 | Brown et al. | Nov. 6, 1956 |
| 2,827,531 | O'Brien | Mar. 18, 1958 |
| 2,932,699 | Reese | Apr. 12, 1960 |
| 2,945,931 | Reese | July 19, 1960 |
| 2,999,914 | Stanaway | Sept. 12, 1961 |

FOREIGN PATENTS

| | | |
|---|---|---|
| 538,409 | Great Britain | Aug. 1, 1941 |